Oct. 18, 1927. 1,645,936
G. SCHLESINGER
METHOD OF AND APPARATUS FOR PRODUCING CYLINDRICAL FORMATIONS
OR HOLLOW BODIES FROM VENEER OR THIN SHEET WOOD
Filed Oct. 25, 1926 4 Sheets-Sheet 1
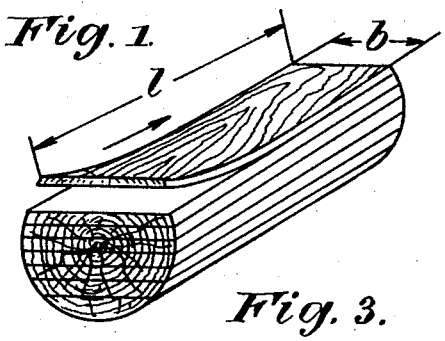
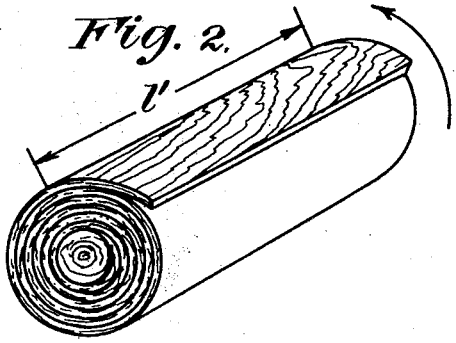
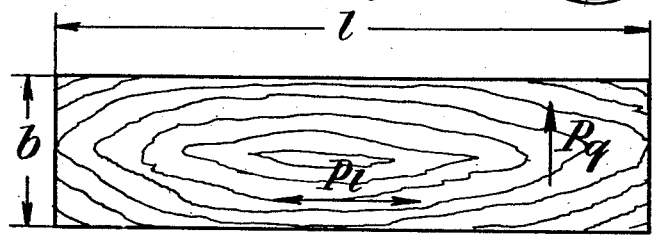
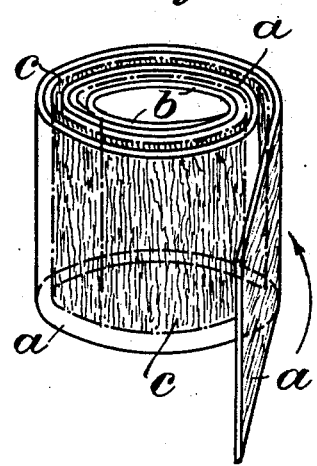
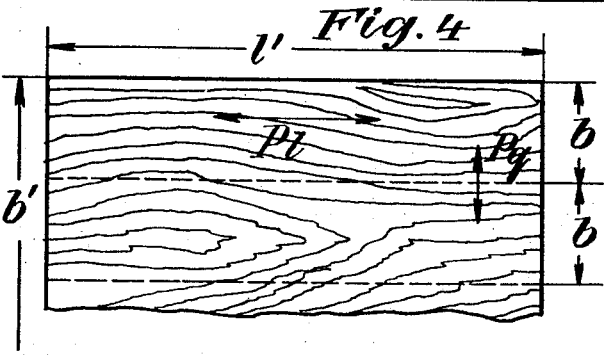
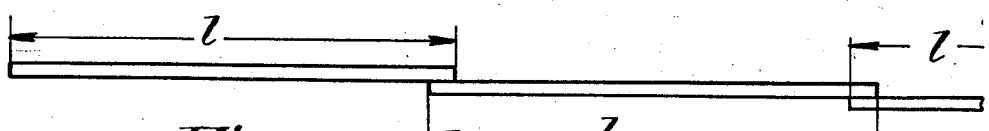
Inventor:
Georg Schlesinger
by
Watson, Coit, Morse + Grindle
Attorney.

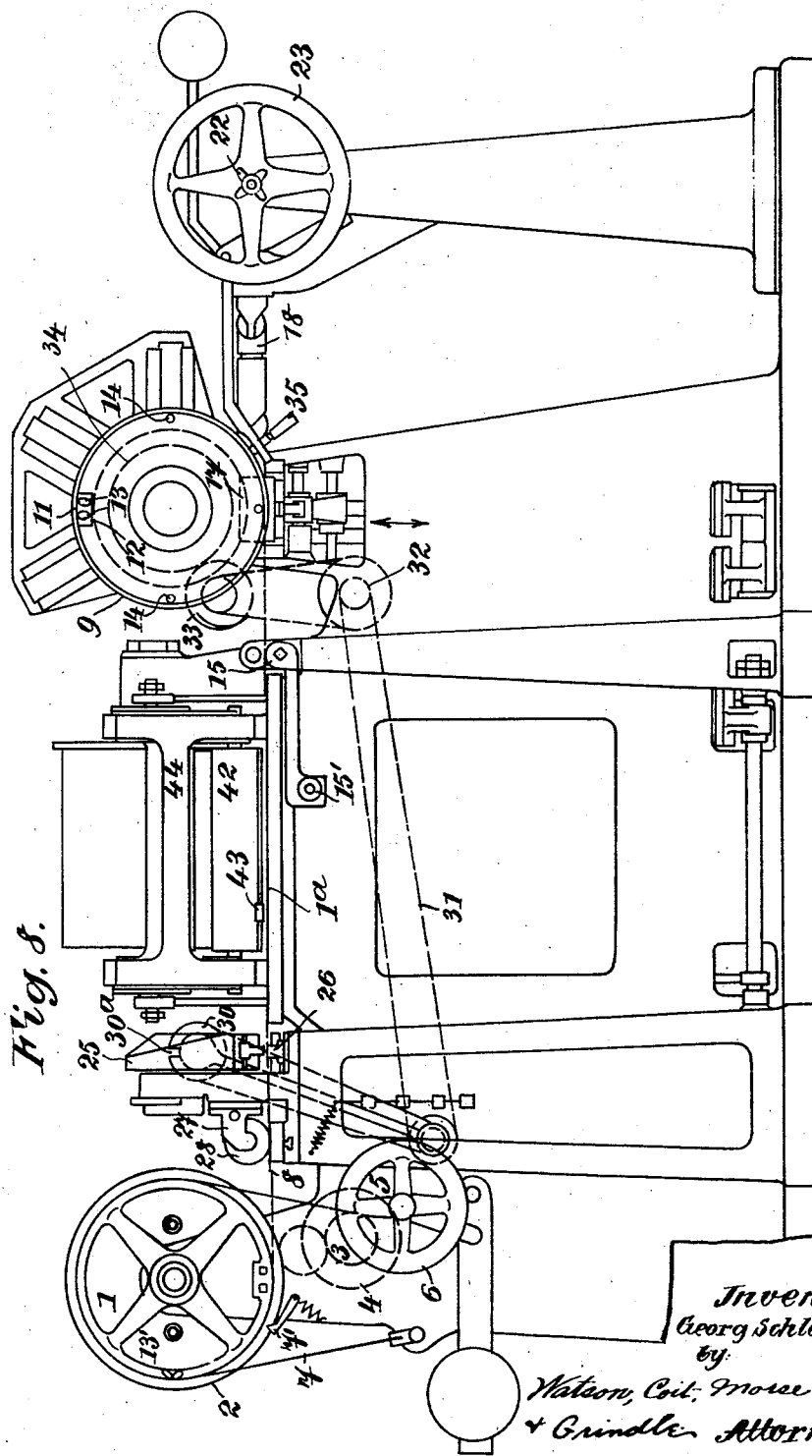

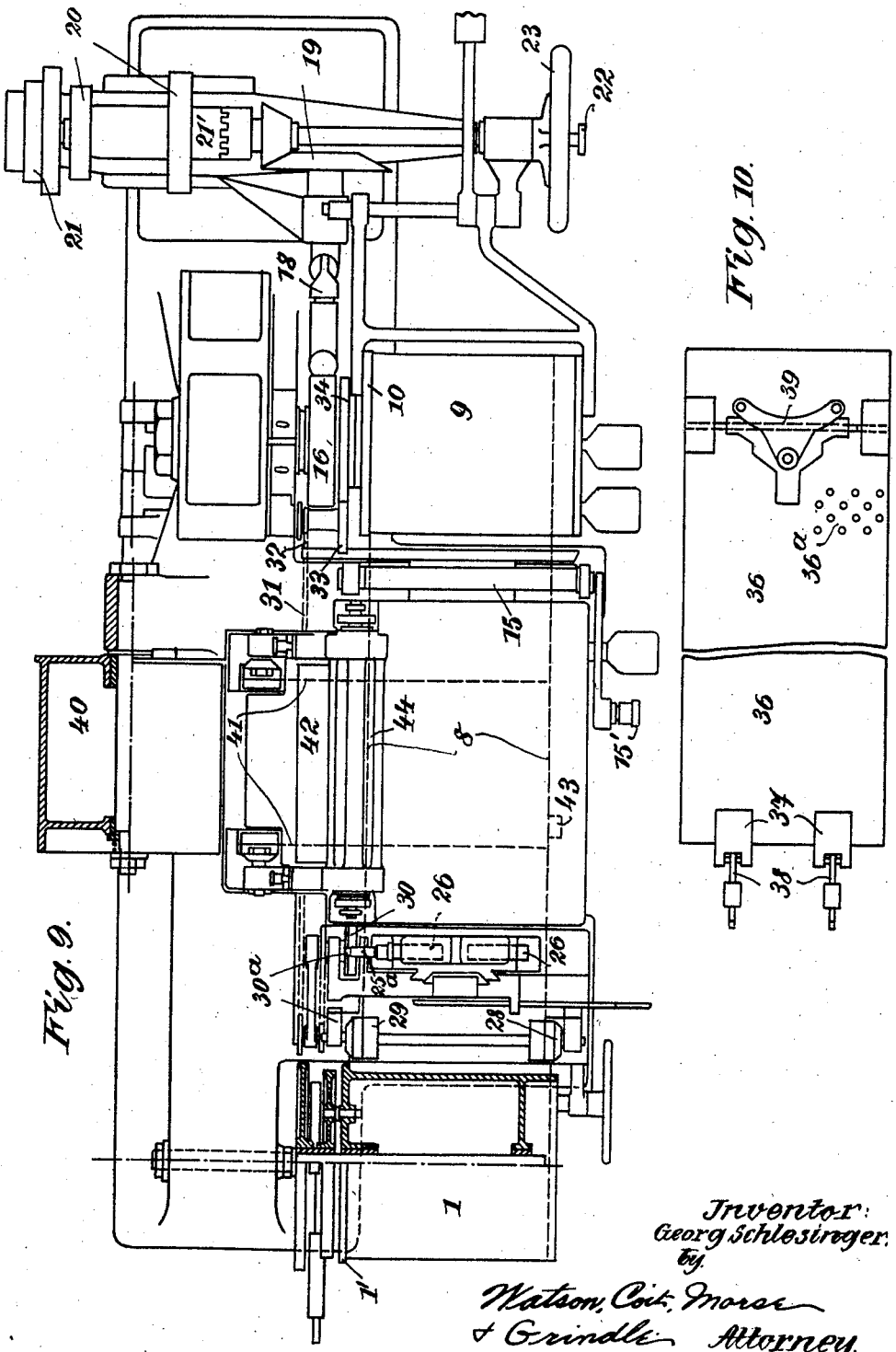

Oct. 18, 1927.  1,645,936

G. SCHLESINGER
METHOD OF AND APPARATUS FOR PRODUCING CYLINDRICAL FORMATIONS
OR HOLLOW BODIES FROM VENEER OR THIN SHEET WOOD
Filed Oct. 25, 1926   4 Sheets-Sheet 4

Inventor:
Georg Schlesinger
by:
Watson, Coit, Morse & Grindle
Attorney.

Patented Oct. 18, 1927.

1,645,936

UNITED STATES PATENT OFFICE.

GEORG SCHLESINGER, OF BERLIN-CHARLOTTENBURG, GERMANY.

METHOD OF AND APPARATUS FOR PRODUCING CYLINDRICAL FORMATIONS OR HOLLOW BODIES FROM VENEER OR THIN SHEET WOOD.

Application filed October 25, 1926, Serial No. 144,120, and in Germany December 24, 1923.

My invention relates to improvements in the method of and apparatus for producing cylindrical formations or hollow bodies from veneer or thin sheet wood, and more particularly in the method in which an elongated band composed of overlapping strips of veneer or thin wooden band joined together at their ends is wound on a suitable core so as to produce multi-ply formations. One of the objects of the improvements is to provide a formation of this type which has great strength and which can be manufactured at comparatively low cost. With this object in view my invention consists in inserting strips or a band having the fibres or grain running crosswise between the successive layers of the band being wound on the drum. Another object of the improvements is to provide a machine by means of which the said method can be carried out in an economical way. With this object in view my invention consists in constructing an apparatus comprising a winding drum in combination with means for supplying thereto under tension, the built up veneer or thin wood band having the fibres or grain running longitudinally thereof, and means for supplying laterally of such band, in its passage to the winding drum or core, veneer or thin wooden band also having the fibres running longitudinally thereof.

Figure 11:
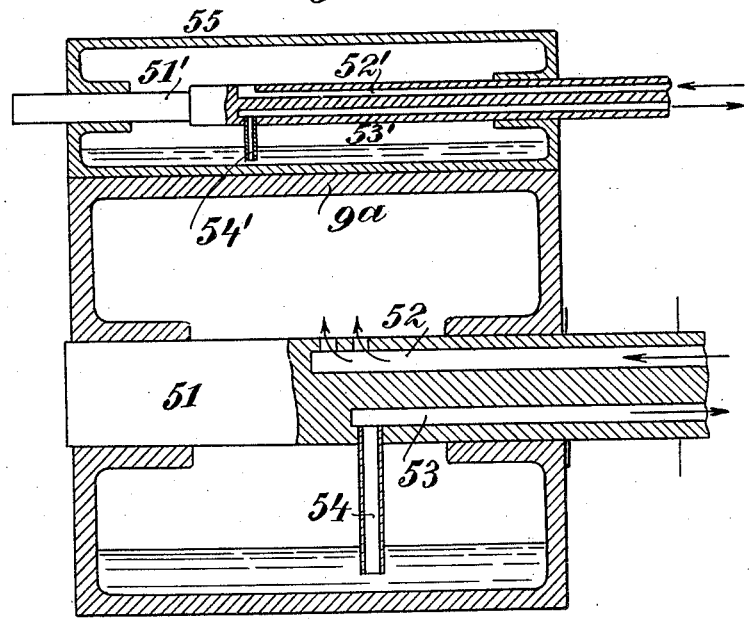
Figure 12:
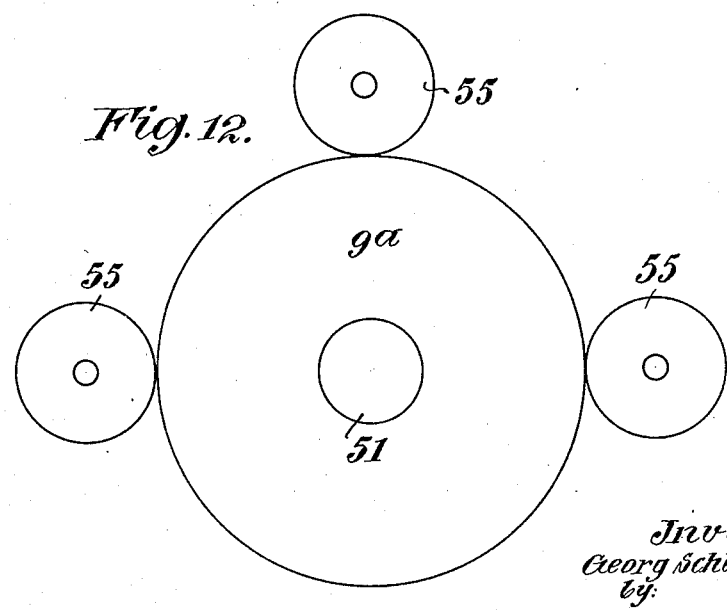

For the purpose of explaining the invention the method of manufacturing a cylindrical formation and an apparatus used in the manufacture of the said formation have been shown in the accompanying drawings, in which the same letters of reference have been used in all the views to indicate corresponding parts. In said drawings, Fig. 1, is a perspective view illustrating one of the known slicing methods of forming veneer or thin wooden strips from a log of wood, Fig. 2, is a similar view illustrative of the known rotary cutting or peeling method of making veneer or thin sheet wood from the log, Fig. 3, is a plan of a strip made in accordance with the method illustrated by Fig. 1, Fig. 4, is a plan of part of a thin wood sheet or web made in accordance with the method illustrated by Fig. 2, the dotted lines showing how the web may be divided into strips with the fibres running longitudinally, Fig. 5, illustrates by elevation and plan a suitable manner of assembling strips, such as are shown in Figs. 3 and 4, for the formation of a long band capable of being wound under heavy tensile stress in carrying out the manufacture in the making of cylindrical formations or hollow bodies under heavy tensile stress in accordance with this invention, Fig. 6, shows in elevation another way of assembling the strips to form a long band, Fig. 7, is a perspective view of the method of winding the bands in accordance with the invention, Fig. 8, is an elevation showing in diagrammatic manner a machine suitable for making hollow articles according to the method illustrated by Fig. 7, Fig. 9, is a partial sectional plan of the machine shown in Fig. 8, Fig. 10, is a diagrammatical plan view of a belt clamp for keeping a finished article in shape till it is set, Fig. 11, shows in central vertical section a modified form of winding drum with smoothing rolls and internal steam-heating means, and Fig. 12, is an end elevation of Fig. 11 as regarded from the left hand side.

Veneer or thin sheet wood is generally obtained in two forms. As shown in Fig. 1 a log or shaped beam or flitch of rectangular cross-section is sliced or sawn to produce separate flat strips, or a log is cut or peeled spiral fashion, as is indicated in Fig. 2, by means of a knife cutting along a line running parallel to the axis of the log to produce a continuous sheet or web, which web is cut in order to obtain strips. The strips are assembled into a long band by joining their ends together. This may be effected by overlapping the strips at their ends as shown in Fig. 5, and then joining them by glue, by riveting or by threading wire through so as to form a sort of seam and by like methods. As an alternative, however, the strips may be joined into a double-ply band as illustrated by Fig. 6, the two layers being fastened together, by means of glue for example, and the strips arranged in staggered fashion.

According to the method of winding illustrated by Fig. 7, a band a of the form shown for example in Fig. 5 or Fig. 6, is wound under tension around a solid or hollow core b, the band being fed at right angles to the core while the latter is revolved about its longitudinal axis. The band is wound with the fibres or grain running longitudinally and as the winding proceeds a web c of veneer or separate strips of veneer, with the fibres running at right angles to those of the band a is or are inserted so as to be wound in with the band a and form an intermediate layer or layers. In this way a hollow body of ply-wood construction is produced by winding spirally on the core b, the thickness of such hollow body being determined by the number of layers wound on. With this method of winding it is possible to insert sections of web c, or the strips aforesaid, at different intervals of time to obtain desired effects. For example, two layers of the band a may be wound before a layer of the web c, or of the said strips, is wound, a plywood construction, with the fibres of some layers running cross-wise with respect to the fibres of other layers, being nevertheless obtainable. The web c may be of the form shown for example in Fig. 2, such a form of web being advantageous because it would not need to be strong in the longitudinal direction of the web a which is wound under tension.

For the purpose of producing cylindrical formations in accordance with Fig. 7, a machine of the nature shown in Figs. 8 and 9 is suitably employed. In this machine, a supply of veneer or thin wooden band, constructed in accordance with Fig. 5 or Fig. 6 for instance, is carried by a drum 1, from which at the commencement of work, the end of the band 8 is drawn by hand over the bed 1ª of the machine, past a clamping roll 15 and over the lower part of a winding drum 9, up to a longitudinal slot 11 of the drum, through which slot the end of the band is passed and secured by two clamping devices 13, suitable in the form of self-locking eccentric rolls, mounted in the hollow crossmember 12. The band 8 is then tightened by turning the drum 1 backwardly by means of the hand wheel 6 and through the gearing 2, 3, 4, 5. The detent 7', for preventing backward rotation of the drum during the winding operation of the machine, is disengaged while the tightening is taking place. During the winding of the band, pull is exerted by the drum 9 and the band brake 7 associated with the drum 1 maintains the veneer band in tension. The drum 9 may consist of a cylindrical member made of steel plate and be detachably secured to a disk 10 at one end thereof. A number of tensioning rods 14 are suitably distributed around the interior of the drum 9 and these rods are mounted to turn eccentrically upon the arms of a frame, not shown, so that they may serve as a support for the hollow drum part 9. The clamping member or roller 15 is arranged between the supply drum 1 and the winding drum 9, and is adapted to be maintained in the clamping position by springs (not shown). It may be released by a handle 15' and may if necessary, be secured in the open position.

For the purpose of driving the drum 9, a worm wheel 16 is operatively connected to the end disk 10 of the drum and is engaged by a worm 17 connected through a double ball and socket connection 18 with bevel gearing 19 adapted to be driven through toothed gearing 20 from a stepped pulley 21 driven by belt from any convenient source of power. Between the gearing 20 and the bevel gearing 19 a clutch device 21' is inserted which can be thrown into or out of engagement by means of a handle or hand wheel 22, Fig. 9. A hand wheel 23 is mounted on the shaft of the smaller one of the bevel wheels 19 so as to enable the worm and worm wheel 17, 16 to be operated by hand when the clutch 21' is disengaged.

Between the supply and winding drums 1 and 9 there is arranged a perforating punch 25 which is suitably of such shape as to be able to produce transverse slots 26 in the band 8 as seen in Fig. 9. On the frame 27 of the punch 25, trimming rollers or circular cutters 28, 29 are mounted which are able when necessary to cut the band 8 to any desired width during its passage past them. The trimming device 28 is axially adjustable to different positions on its driving shaft so as to correspond with different widths of band abutting on the other side against the flange 1' of the supply drum 1, as shown in Fig. 9.

The excisions 26 are made in the band when a hollow body is almost completely wound on the winding drum 9, and their purpose is to enable a belt clamp, hereinafter described, to be applied to the winding, upon completion, so as to maintain it in its wound condition after separation from the band 8 and until the glue or adhesive used in the winding is fully set. It is to be noted here that it is important that the holes 26 for a given position in the rotation of the winding drum 9 shall be at a definite distance from said drum, and for this reason, special provision is suitably made whereby the operation of the punch 25, which may be carried out by hand, is only possible when the drum is at certain positions in its rotation. For this purpose a locking disk 30 may be provided which only allows the punch to descend when the disk is in the position shown in Fig. 8. As will be seen, the disk is gapped at 30ª and unless this gap is in line with the stop projection 25ª on the punch 25, the punch cannot be depressed.

The locking disk 30 is connected through driving chains 31 and gearing such as 32 with a toothed wheel 33, having engagement with a toothed wheel 34 secured to the worm wheel 16 aforesaid. Therefore, the locking disk 30 can only assume the position shown in Fig. 8, in which punching can take place, at certain predetermined positions in the rotation of the drum 9. The gearing 32 is adapted of course to suit the operation of the disk to the diameter of the winding.

In order to enable the veneer or thin wood corresponding to the layer or layers c in Fig. 7 to be associated with the band 8 in Figs. 8 and 9, so as to give the ply-wood formation with the grain of adjacent layers crossing, another supply drum 40 may be mounted in the machine. This drum may be similar to the drum 1 and wound with a similar band of veneer. The band is seen at 41 and it is fed or drawn over the band 8 from one side and at right angles thereto, at a point between the drums 1 and 9, see Fig. 9. As the band 41 is moved forward, it is passed through a gluing apparatus 42, which may be of any known type, and becomes covered on both sides with a suitable glue or cold glue. At the other side of the band 8 is a stop 43 which is adjustable in position to suit the width of the band 8, and when the band 41 has been moved up to this stop, a cutter 44, preferably actuated by hand or foot lever, is moved by the operator to cut off a portion of a length corresponding substantially to the width of the band 8. This cut-off portion is then positioned on the band 8, whereupon the band 41 is again moved forward and another length cut off. In this way separate sections of the band 41 may be placed transversely on the web 8 stretched between the drums 1 and 9, and, being covered with glue, may become firmly associated with convolutions of the band 8 on the winding drum 9 to give a ply-wood formation. The guide for the transverse web 41 is situated comparatively close to the winding drum 9 and the speed of travel of the band 8 is made such that while the latter is moving, the operator always has sufficient time to draw or feed a fresh section of the band 41 up to the stop 43, to cut it off, and to set it in the correct position relatively to the previously applied section.

The worm 17 aforesaid is preferably mounted so that it can be moved into and out of engagement with the worm wheel 16 in order to allow the operator to adjust the disk 10 with respect to the drum 9 or vice versa as may be desired. This movement of the worm may be effected by hand or foot lever mechanism which it is not necessary to illustrate, and the double-ball and socket connection 18 allows of the movement. A cutter 35 also operated by a hand or foot lever and adapted to be moved longitudinally of the drum, may be provided for separating the band 8 from the finished winding on the drum. This cutter is shown in operative position in Fig. 8, but it is mounted on a swingable lever member so that during winding it may be moved out of cutting position.

The belt clamp already mentioned is shown in Fig. 10 in its extended or opened out condition. Preferably, it consists of a perforated thin steel band 36 of a width corresponding to the length or height of the hollow body to be manufacutred. By way of illustration, some of the perforations in the belt are shown at 36ª in the drawing. At one end the band 36 has two extension parts 37 capable of being passed through the holes 26 in the web or band 8 (Fig. 9). The extensions 37 may carry hook members 38 which may be engaged with the perforated extremities of a yoke 39 at the other end of the band 36. This yoke is pivotally mounted on a clamping lever 39ª movable about the axis 39' to draw up the yoke 39 somewhat as in known clamp lever lock mechanism to make it possible to apply the belt around a winding under considerable tension and automatically lock it thereon. A belt clamp of this nature may, of course, be used for clamping any other form of winding according to this invention as will be readily understood.

In the operation of the apparatus shown in Figs. 8 and 9, the drum 1 is first of all filled by placing a loose coil of the veneer or thin wood band on it and securing this at the inner end by the clamping device 13' which is similar to the clamping device 13 of the drum 9. The outer or free end of the coil is then taken and passed beneath the punch 25 and between the trimming wheels 28, 29, over the bed 1ª and then through the clamp 15 to the slot 11 in the drum 9, Fig. 8, where the end is secured by the clamping device 13. The detent 7' is now disengaged whereupon the drum 1 is rotated backwardly by the hand-wheel 6 until the convolutions of the coil on the drum are tight and the desired tension imparted to the band 8. The brake band 7, which until now has been loose, is then tightened and the detent 7' re-engaged. The clutch 21' is then engaged so connecting it with the belt drive by the pulley 21 and the winding proceeds. During the winding the laterally fed band 41 is applied to the band 8 in sections as already explained. This is preferably commenced at such a moment that the first laterally fed section passes on to the drum 9 when the latter has been covered by one layer of the band 8. The holes 26 are punched in the band 8 before the band length, necessary for the particular hollow body being made, has been completely wound. Shortly before the holes 26 reach the winding drum 9, the belt clamp 36 is placed in position with its projecting parts 37, 38, passed through the holes, and when the latter reach the position of the swung-out cutter 35 the drive for the drum 9 is thrown out. The belt clamp is then tightened around the hollow winding, the clamp 15 is tightened and the cutter 35 swung into position to separate the length from the band 18, the hook members 38 having passed the cutting point and the steel belt serving as a support during cutting. The inner end of the band length at the clamp 13 may now be cut off in any suitable manner. For example, the inner edges of the clamping rolls 13 may comprise knife edges for cutting off the inner end of the band sharply. The drum part 9 is then released from the disk 10 and taken with the winding surrounded by the belt clamp 36, to a drying chamber to set. When a fresh winding is to take place, another drum 9 is installed, the clamp 15 is released and the end of the band again drawn to the clamp 13 whereupon the procedure is the same as before.

The time taken for setting depends upon the kind of adhesive used. Ordinary joiner's glue needs a comparatively long period for binding. On the other hand it is possible to manufacture cold glue such that it binds in three to four minutes. Other kinds of cold glue need about 15 to 20 minutes, so that generally it is advisable to have the belt clamp in order to use the machine to advantage.

In order to facilitate removal of the winding from the drum member 9, after the glue or adhesive has hardened, the tension on such drum member 9 may be removed by releasing the tensioning rolls 14 aforesaid.

The construction of the disk 10 is preferably such that it will allow drum members 9 of various diameters to be secured to it so that work of different diameters can be produced. In such a case the band 8 may be arranged to run at different elevations, as by making the bed 1ª vertically adjustable. The guide frame for the lateral band 41 would also be arranged so as to be correspondingly adjustable and the punch frame 27 and clamps 15 be arranged so as to be similarly adjusted. As an alternative, however, and as shown, arrangement may be made for adjustment of the disk 10. In order to insure that the band 8 shall always run horizontally to the bed 1ª it is advantageous to locate an adjustable guide roller for the band in the neighbourhood of its supply drum 1.

If the length of the drum 9 or the width of the band 8 be such that the ply-wood winding produced on the drum projects a short distance therefrom at the end remote from the disk 10, then after removal of the wound drum 9, a disk or bottom can be applied immediately to the hollow winding to convert it into a cylindrical box or container open at one end, in which event the edge at one end of the drum part 9 may be used as an abutment in applying such bottom.

The drum arrangement illustrated in Figs. 11 and 12 is advantageous for use when it is desired to apply heat to the hollow body or winding on the drum 9. This is the case, for example, when cold glue is used in making the winding, it being possible by using suitably prepared cold glue, to make the joints sufficiently strong while the winding is still on the winding drum provided that the glue is subject to sufficient heating. The arrangement seen in Figs. 11 and 12 enables the glued winding to be brought to a suitably high and regulatable temperature by the use, for example, of super-heated steam. The drum 9ª, therein shown, is constructed as a hollow body mounted on a shaft or spindle 51 with the use if necessary, of stuffing boxes for packing purposes. A steam inlet 52, opening upwardly, is provided in the shaft 51 and an outlet passage 53 for water of condensation which is drawn out through a vertical pipe 54 depending almost to the inner wall of the drum. Disposed around the drum 9ª, at intervals apart, are three rollers 55 which are capable of being made to bear with suitable pressure upon the wooden winding on the drum, as it is built up, so as mechanically to smooth it. These rollers 55 may also be heated to increase the drying action by forming each of their shafts 51' (see Fig. 11) with a steam supply duct 52' and a condensation-water duct 53' having a draw-off pipe 54'. The heating of the drum 9ª and smoothing rollers 53 may also be carried out electrically or in any other suitable manner.

While in describing the invention reference has been made to a particular example embodying the same I wish it to be understood that my invention is not limited to the construction shown in the drawings, and that various changes may be made in the general arrangement of the apparatus and the construction of its parts without departing from the invention.

I claim:

1. The herein described method of making cylindrical formations or hollow bodies from veneer or thin sheet wood, which consists in feeding a band of veneer or thin wooden band composed of overlapping strips joined together with the fibres or grain running longitudinally under tension while feeding strips or band with the fibres or grain running cross-wise of the first-mentioned band, and winding the two bands together so as to produce multi-ply formations with the fibres or grain of adjacent layers crossing or intersecting one another.

2. The herein described method of making cylindrical formations or hollow bodies from veneer or thin sheet wood, which consists in feeding a band of veneer or thin wooden band composed of overlapping strips joined together with the fibres or grain running longitudinally to a rotary member, feeding a band having the fibres or grain running cross-wise of the first-mentioned band, supplying a suitable binding medium as this band is fed on the first-named band, and winding both bands or strips under tension on the said rotary member, so as to produce multi-ply formations with the fibres or grain of adjacent layers crossing or intersecting one another.

3. An apparatus suitable for making cylindrical formations or hollow bodies from veneer or thin sheet wood, comprising a winding drum or core, means for supplying veneer or thin wooden band to the drum under tension, and means for supplying veneer or thin wooden band transversely to said first-named band in its passage to the winding drum or core.

4. An apparatus suitable for making cylindrical formations or hollow bodies from veneer or thin sheet wood, comprising a winding drum or core, a braked supply drum for supplying the veneer or thin wooden band under tension to the winding drum, and means for supplying veneer or thin wooden band transversely to said first-named band in its passage to the winding drum or core.

5. An apparatus suitable for making cylindrical formations or hollow bodies from veneer or thin sheet wood, comprising a winding drum or core, a braked supply drum for supplying the veneer or thin wooden band under tension to the winding drum, and a second supply drum or roller mounted for the supply of a second band of the veneer or thin wooden band laterally of the first-mentioned band.

6. An apparatus suitable for making cylindrical formations or hollow bodies from veneer or thin sheet wood, comprising a winding drum or core, a braked supply drum for supplying the veneer or thin wooden band under tension to the winding drum, means for supplying veneer or thin wooden band to said first-named band in its passage to the winding drum or core, and a clamp device arranged between the brake supply drum and the winding drum.

7. An apparatus suitable for making cylindrical formations or hollow bodies from veneer or thin sheet wood, comprising a winding drum or core, means for supplying veneer or thin wooden band to the drum under tension, means for supplying veneer or thin wooden band to said first-named band in its passage to the winding drum or core, and a punch device located in position for punching the veneer or thin wooden band being fed to said drum or core.

8. An apparatus suitable for making cylindrical formations or hollow bodies from veneer or thin sheet wood, comprising a winding drum or core, means for supplying veneer or thin wooden band to the drum under tension, means for supplying veneer or thin wooden band to said first-named band in its passage to the winding drum or core, a punch device located in position for punching the veneer or thin wooden band being fed to said drum or core, means for rendering said punch device inoperative, and mechanism positively connected with said winding drum or core for releasing said means for rendering inoperative.

9. An apparatus suitable for making cylindrical formations or hollow bodies from veneer or thin sheet wood, comprising a winding drum or core, a braked supply drum for supplying the veneer or thin wooden band under tension to the winding drum, means for supplying veneer or thin wooden band to said first-named band in its passage to the winding drum or core, a punch device arranged between the braked supply drum and the winding drum, and a locking device controlled from the winding drum adapted to lock said punch device in inoperative position.

10. An apparatus suitable for making cylindrical formations or hollow bodies from veneer or thin sheet wood, comprising a winding drum or core, means for supplying veneer or thin wooden band to the drum under tension, band trimming means, and a feeding device for supplying veneer or thin wooden band to said first-named band in its passage to the winding drum or core.

11. An apparatus suitable for making cylindrical formations or hollow bodies from veneer or thin sheet wood, comprising a rotary disk, a winding drum or core removably secured to said disk, means for supplying veneer or thin wooden band to the drum under tension, and a feeding device for supplying veneer or thin wooden band to said first-named band in its passage to the winding drum or core.

12. An apparatus suitable for making cylindrical formations or hollow bodies from veneer or thin sheet wood, comprising a winding drum or core, a braked supply drum for supplying the veneer or thin wooden band under tension to the winding drum, means for supplying veneer or thin wooden band to said first-named band in its passage to the winding drum or core, an adjustable stop member for determining the feed of the veneer or thin wooden band being supplied to said first-named band, and cutting means for separating the said veneer or thin wooden band supplied to said first-named band from the body thereof.

13. An apparatus suitable for making cylindrical formations or hollow bodies from veneer or thin sheet wood, comprising a winding drum or core, means for supplying veneer or thin wooden band to the drum under tension, means for supplying veneer or thin wooden band transversely to said first-named band in its passage to the winding drum or core, and means for heating said winding drum or core.

14. An apparatus suitable for making cylindrical formations or hollow bodies from veneer or thin sheet wood, comprising a winding drum or core, means for supplying veneer or thin wooden band to the drum under tension, means for supplying veneer or thin wooden band transversely to said first-named band in its passage to the winding drum or core, and a smoothing roll arranged exteriorly of the winding drum.

15. An apparatus suitable for making cylindrical formations or hollow bodies from veneer or thin sheet wood, comprising a winding drum or core, means for supplying veneer or thin wooden band to the drum under tension, means for supplying veneer or thin wooden band transversely to said first-named band in its passage to the winding drum or core, a smoothing roll arranged exteriorly of the winding drum, and means for heating said smoothing roll.

16. An apparatus suitable for making cylindrical formations or hollow bodies from veneer or thin sheet wood, comprising a winding drum or core, means for supplying veneer or thin wooden band to the drum under tension, means for supplying veneer or thin wooden band transversely to said first-named band in its passage to the winding drum or core, and means for maintaining the cylindrical body wound on said winding drum or core in shape until set.

17. An apparatus suitable for making cylindrical formations or hollow bodies from veneer or thin sheet wood, comprising a winding drum or core, means for supplying veneer or thin wooden band to the drum under tension, means for supplying veneer or thin wooden band to said first-named band in its passage to the winding drum or core, and a belt clamp device fitted with a self-locking clamp mechanism and constructed for being placed around the cylindrical body formed on said winding drum or core for maintaining the same in shape until set.

18. An apparatus suitable for making cylindrical formations or hollow bodies from veneer or thin sheet wood, comprising a winding drum or core, means for supplying veneer or thin wooden band to the drum under tension, means for supplying veneer or thin wooden band to said first-named band in its passage to the winding drum or core, and a cutter which is swingably mounted to permit it to be moved into and out of operative position for severing the band.

19. An apparatus suitable for making cylindrical formations or hollow bodies from veneer or thin sheet wood, comprising a winding drum or core, means for supplying veneer or thin wooden band to the drum under tension, means for punching said veneer or band, a belt clamp having fastening parts at one end capable of being passed through the hole made by said punching means and engaged with complemental fastening parts at the other end of the belt clamp, and means for severing the band after tensioning the belt clamp.

In testimony whereof I hereunto affix my signature.

GEORG SCHLESINGER.